(12) United States Patent
Jang et al.

(10) Patent No.: US 9,105,004 B2
(45) Date of Patent: Aug. 11, 2015

(54) AUTOMATIC LOGISTICS SYSTEM USING TRIGGER FORWARDING DEVICE

(71) Applicant: Zhuhai Sunhome Information Co., Ltd., Zhuhai, Guangdong (CN)

(72) Inventors: Chii Tsong Jang, Zhuhai (CN); Depin Gong, Zhuhai (CN); Deqiang Gong, Zhuhai (CN)

(73) Assignee: Zhuhai Sunhome Information Co., Ltd., Zhuhai, Guangdong (KR)

( * ) Notice: Subject to any disclaimer, the term of this patent is extended or adjusted under 35 U.S.C. 154(b) by 0 days.

(21) Appl. No.: 14/123,829

(22) PCT Filed: Dec. 26, 2012

(86) PCT No.: PCT/CN2012/087499
§ 371 (c)(1),
(2) Date: Dec. 4, 2013

(87) PCT Pub. No.: WO2013/143338
PCT Pub. Date: Oct. 3, 2013

(65) Prior Publication Data
US 2015/0008259 A1    Jan. 8, 2015

(30) Foreign Application Priority Data

Mar. 27, 2012 (CN) .......................... 2012 1 0082456
Mar. 27, 2012 (CN) .......................... 2012 2 0117623

(51) Int. Cl.
*G06Q 10/08* (2012.01)
*G06Q 50/28* (2012.01)

(52) U.S. Cl.
CPC .............. *G06Q 10/087* (2013.01); *G06Q 10/08* (2013.01); *G06Q 50/28* (2013.01); *H05K 999/00* (2013.01)

(58) Field of Classification Search
USPC ........... 235/385, 494; 709/203; 439/488, 660, 439/638
See application file for complete search history.

(56) References Cited

U.S. PATENT DOCUMENTS

| | | | |
|---|---|---|---|
| 2007/0200712 A1* | 8/2007 | Arneson et al. | 340/572.8 |
| 2010/0125729 A1* | 5/2010 | Baentsch et al. | 713/151 |
| 2011/0250786 A1* | 10/2011 | Reid | 439/488 |
| 2012/0147798 A1* | 6/2012 | Miller et al. | 370/310 |

(Continued)

OTHER PUBLICATIONS

Abstract of Chinese Patent—CN101035311, Sep. 12, 2007, 1 page.
Abstract of Chinese Patent—CN101567825, Oct. 28, 2009, 1 page.
Abstract of Chinese Patent—CN101799898, Aug. 11, 2010, 1 page.
Abstract of Chinese Patent—CN201583997, Sep. 15, 2010, 1 page.
Abstract of Chinese Patent—CN102622625, Aug. 1, 2012, 2 pages.

(Continued)

*Primary Examiner* — Allyson Trail
(74) *Attorney, Agent, or Firm* — Dority & Manning, P.A.

(57) ABSTRACT

An automated logistics system comprising radio frequency identification device (RFID) chips, an RFID reader-writer, a computer and a triggering-forwarding device is provided. The triggering-forwarding device forwards received signals of information input equipment to the computer by a network and can utilize output signals to trigger different operating states of other equipment connected with the triggering-forwarding device or a software system arranged on the other equipment; the output signals also can be used as check data for information read by the RFID reader-writer; and the triggering-forwarding device also can be used for receiving feedback information of the computer and displaying the feedback information by a display module. Due to addition of the triggering-forwarding device in the scene design of enterprise, software programming is simpler, the automated logistics system has strong applicability, identified targets are more definite and feedback information can be timely obtained to timely solve error problems.

8 Claims, 4 Drawing Sheets

(56) References Cited

U.S. PATENT DOCUMENTS

Figure 1:
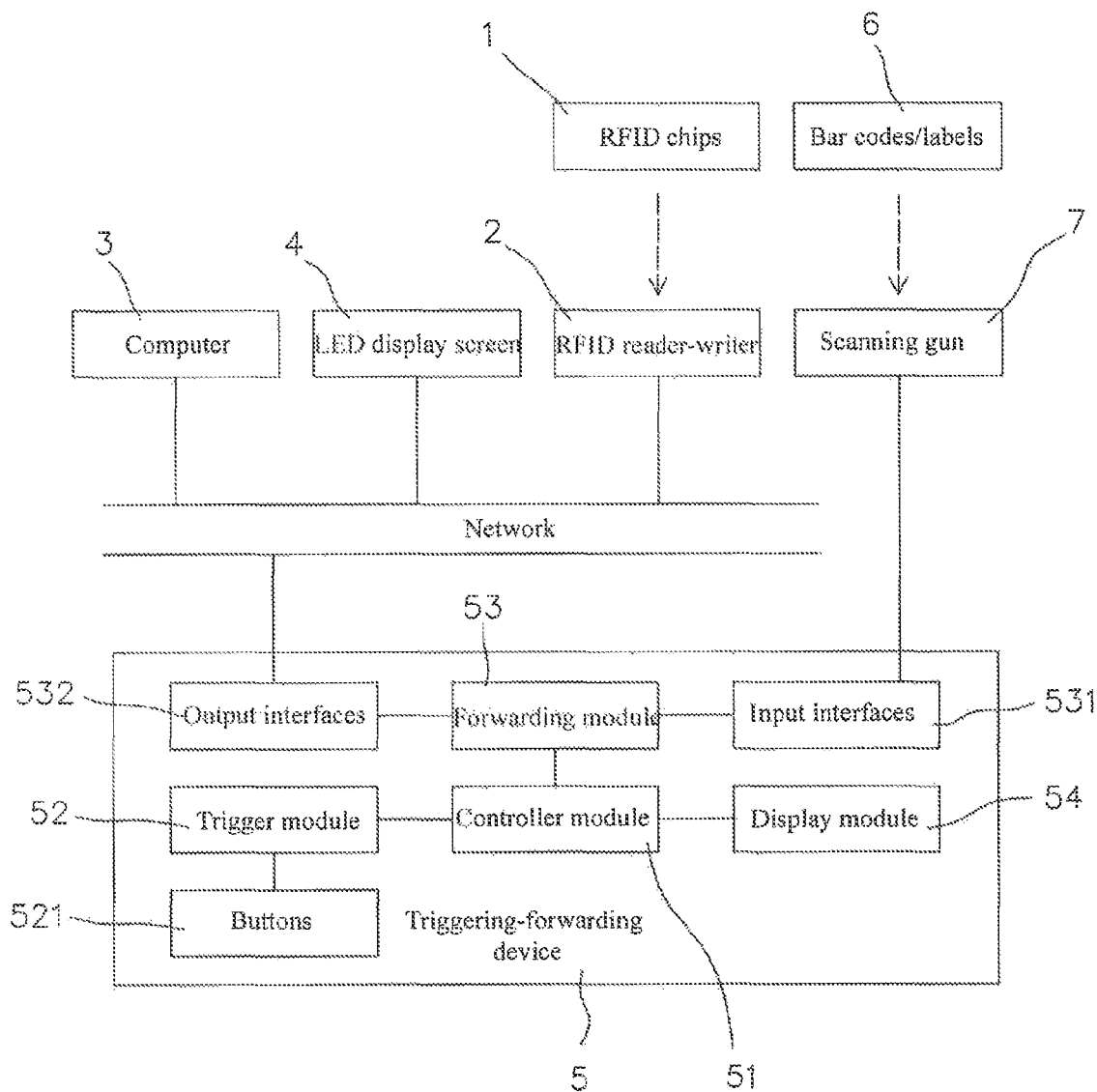

| | | | |
|---|---|---|---|
| 2012/0190386 A1* | 7/2012 | Anderson | 455/456.3 |
| 2013/0020390 A1* | 1/2013 | Chen | 235/385 |
| 2014/0263677 A1* | 9/2014 | Divringi et al. | 235/494 |

OTHER PUBLICATIONS

Abstract of Chinese Patent—CN202512599, Oct. 31, 2012, 1 page.
International Search Report for PCT/CN2012/087499 dated Apr. 4, 2013, 3 pages.

* cited by examiner

AUTOMATIC LOGISTICS SYSTEM USING TRIGGER FORWARDING DEVICE

CROSS REFERENCE TO RELATED APPLICATION

This application is the national stage entry of International Patent Application No. PCT/CN2012/087499 having a filing date of Dec. 26, 2012, which claims priority to and the benefit of Chinese Patent Application No. 201210082456.8 filed in the Chinese Intellectual Property Office on Mar. 27, 2012 and Chinese Patent Application No. 201220117623.3 filed in the Chinese Intellectual Property Office on Mar. 27, 2012, the entire contents of which are incorporated herein by reference.

TECHNICAL FIELD OF THE INVENTION

The invention relates to the field of automated logistics and automated production, in particular to an automated logistics system using a triggering-forwarding device.

TECHNICAL BACKGROUND OF THE INVENTION

In the production and logistics field, the automated management information technology is relatively lagging behind, part of enterprises do not have an information system for production and logistics and even though some enterprises have the logistics information system, service functions and hardware equipment of the information system of the enterprises are all imperfect, the logistics information system is short of necessary system modules on the aspects of production management module, warehouse management, cargo tracking, transportation management and the like and capability of integrating logistics information resources is still not formed, much less automation of production and logistics management.

Management of the logistics industry has roughly gone through the following four stages:

the first stage of management of the logistics industry, wherein management of the logistics industry is mainly completed by manually identifying information and manually inputting the information into a computer, so that not only is labor wasted, but also accuracy of the information cannot be ensured and more crucially, a great number of paper documents are difficult to perfectly store and difficulty in information search is high;

the second stage of bar code input automation of the logistics industry, wherein related information of products is identified by bar codes; the bar codes are manually scanned into a computer one by one; and the second stage is improved relative to the first stage of inputting the information totally by a keyboard, however, the bar codes still need to be singly input one by one and the second stage is very wasteful for human resources;

the third stage of radio frequency identification device (RFID) automated logistics of the logistics industry, wherein related information of products is automatically identified by RFIDs; an identification result is automatically input into a computer; the computer judges accuracy of input product information and carries out voice prompt; the information is manually stored into software of a logistics system according to a prompt result or storage is canceled; manual operation and manual judgment are still required; and human resources are greatly wasted;

the fourth stage of RFID full-automated logistics of the logistics industry, wherein on the basis of the third stage, infrared sensors, pressure-sensitive sensors, temperature sensors and the like are added, however, the sensors have a certain defects in a certain special application environments; for example, the infrared sensors and the pressure-sensitive sensors cannot be started and stopped according to subjective thinking of people, triggering of information also does not have accurate target, and as long as objects pass through the infrared sensors and the pressure-sensitive sensors, the infrared sensors and the pressure-sensitive sensors can be triggered and can send out uncertain information, so that other automatic equipment in each scene abnormally works; and in addition, all the sensors currently provided in the market do not have an information feedback function.

Logistics automation in the fourth stage still remains at the level of operating the automatic equipment by specially-assigned people or is complete intelligent automation. Complete intelligent automation brings great difficulty to logical analysis and judgment of the computer and once the information is inaccurate, more errors and manual check work are possibly caused. According to the prior art, to achieve complete intelligent production and logistics automation, corresponding hardware and software equipment is still immature and still needs to be further researched and developed.

SUMMARY OF THE INVENTION

To overcome the defects above and meet the requirements of the market, the invention aims to provide an automated logistics system using a triggering-forwarding device, which not only can enable information input equipment without a network function to have network capability, but also brings great convenience to programming of automated logistics software and simplifies complex logical judgment by the triggering-forwarding device with triggering, forwarding and receiving functions in the automated logistics system.

The invention adopts the technical scheme:

an automated logistics system using the triggering-forwarding device, comprising:

RFID chips, which are attached to identified targets (cargoes or containers for accommodating the cargoes) and are used for recording related information of the identified targets;

a RFID reader-writer, for reading information of the RFID chips on the containers by utilizing a non-contact multi-read remote automated identification function;

a computer, connected with a database server by a network to analyze and process related data; and the triggering-forwarding device, which is provided with a controller module, a trigger module, a forwarding module and a display module, wherein the trigger module is provided with at least one button capable of defining an output signal; the forwarding module comprises at least one input interface connected with information input equipment and at least one output interface connected with the computer by the network, is used for forwarding received signals of the information input equipment to the computer by the network and can utilize the output signal defined by each button to trigger different operating states of other equipment directly or indirectly connected with the triggering-forwarding device or a software system arranged on the other equipment; output signals of the trigger module and the forwarding module also can be used as check data for the information read by the RFID reader-writer (2); and the triggering-forwarding device also can receive feedback information of the computer and display the feedback information by the display module of the triggering-forwarding device.

As one improvement of the technical scheme above, the system further comprises:

bar codes/labels, for recording the related information of the identified targets; and a scanning gun (7), for scanning information of the bar codes/labels.

As one improvement of the technical scheme above, the system further comprises:

a light emitting diode (LED) display screen connected with the computer, which is used for displaying related information in the automated production and logistics process.

As one improvement of the technical scheme above, the input interfaces comprises serial ports, parallel ports and universal serial bus (USB) interfaces.

As one improvement of the technical scheme above, the output interfaces are registered jack-45 (RJ-45) network interfaces or wireless network interfaces.

As one improvement of the technical scheme above, in application of automated warehousing scene, the output signal defined by each button represents the number of clusters with the same container number and is used for checking the data read by the RFID reader-writer (2) when different operating states of other equipment directly or indirectly connected with the triggering-forwarding device or the software system on the other equipment are triggered.

As one improvement of the technical scheme above, in applications of automated ex-warehousing scene of empty container and automated recovery scene of empty container, the output signals defined by the buttons respectively represent different commands and the commands are used for triggering different operating states of other equipment directly or indirectly connected with the triggering-forwarding device or the software system on the other equipment.

As one improvement of the technical scheme above, in the application of automated ex-warehousing scene of empty container, the commands comprise reread, cancel and confirmation.

As one improvement of the technical scheme above, in the application of automated recovery scene of empty container, the commands comprise start, pause and completion.

The invention has the beneficial effects:

1, benefits brought to the scene design when an enterprise uses the triggering-forwarding device, wherein (1) the triggering-forwarding device is added into the enterprise scene design so as to bring great convenience to programming of automated production and automated logistics software and simplify complex logical judgment and certain judgment results of people are integrated into the software system by the triggering-forwarding device so as to enable software programming to be simpler;

(2) the triggering-forwarding device has strong applicability in each scene of production and logistics and as long as different character information is given to each button of the triggering-forwarding device according to different scenes of logistics and production, the triggering-forwarding device can be applied in various scenes of automated production and automated logistics;

(3) addition of the triggering-forwarding device enables the identified targets in each scene of enterprise production and logistics to be more definite; triggering of information of triggering devices currently used in the market, such as infrared sensors, does not have accurate target and as long as objects pass through the triggering devices, the triggering devices can be triggered and can send out uncertain information so as to cause other automatic equipment in each scene to abnormally works, thereby possibly bringing more errors and manual check work; and different character and voice information is given to the buttons by the triggering-forwarding device according to different business requirements so as to enable the identified targets to be more definite and solve the problem that in other triggering devices, trigger commands cannot be definitely given;

(4) the environment requirements on scene layout are reduced; the infrared sensors, pressure-sensitive identifiers, visual identifiers, temperature identifiers and flow identifiers currently used in the market all need to be used in the specific environments; selection of the specific environments should consider occurrence of exceptional events and for example, special sensing channels need to be created for pressure-sensitive sensors to avoid objects which do not need to be identified passing through; however, scene layout of the triggering-forwarding device is very convenient and simple; and the triggering-forwarding device only needs to be hung in a place where users can touch and which is convenient for users to press the buttons on the device;

(5) after the triggering-forwarding device is used in each scene, feedback information can be timely obtained, which is convenient to timely solve the error problem; other hardware and software are started to work by the device, RFIDs automatically carry out identification, the software system analyzes and judges accuracy that the RFID reader-writer reads the data and a result is directly fed back on a liquid crystal display (LCD) screen (or an LED display screen) of the device, so that users can directly and visually observe the result, find errors at first time and correct the errors, and thus, error probability in the enterprise production and logistics process is reduced and the management level of the enterprise is improved;

(6) the employment threshold of related operation personnel is reduced and training cost of the enterprise is reduced; and operation is simplified, only simple manual operation needs to be carried out and other automatic equipment in each scene can correspondingly work according to intentions of people by pressing down a certain button on the triggering-forwarding device (people determine to press the buttons according to the requirements of actual businesses in each scene);

2, benefits brought when the enterprise uses the scenes, wherein (1) the enterprise integrates information of various scenes in the production and logistics by the software system, enriches all information in the production process of products, provides effectively and complete data support and can better control product quality;

(2) when using an automated ex-warehousing scene of empty container and combining material requirement planning (MRP) software, the enterprise can accurately know a current container condition and demand of empty containers (boxes) in the workshop field and can timely carry out distribution and delivery as required;

(3) when the enterprise uses a finished product warehousing scene and combines MRP stock-sell-storage software, firstly, a current inventory status of a warehouse can be clearly, accurately and rapidly searched and even information, such as current materials in the warehouse, placement positions of the materials, the number of the materials and the like, can be known; secondly, the positions of cargoes in the warehouse can be accurately positioned, labor cost is reduced and production efficiency is improved; and thirdly, a first-in first-out system can be better executed and backlogging of warehouse cargoes is reduced;

(4) when using an automated recovery scene of empty container and combining empty container recovery software, the enterprise can look up the number of empty containers retained at a client at any time.

DRAWINGS OF THE INVENTION

Figure 2:
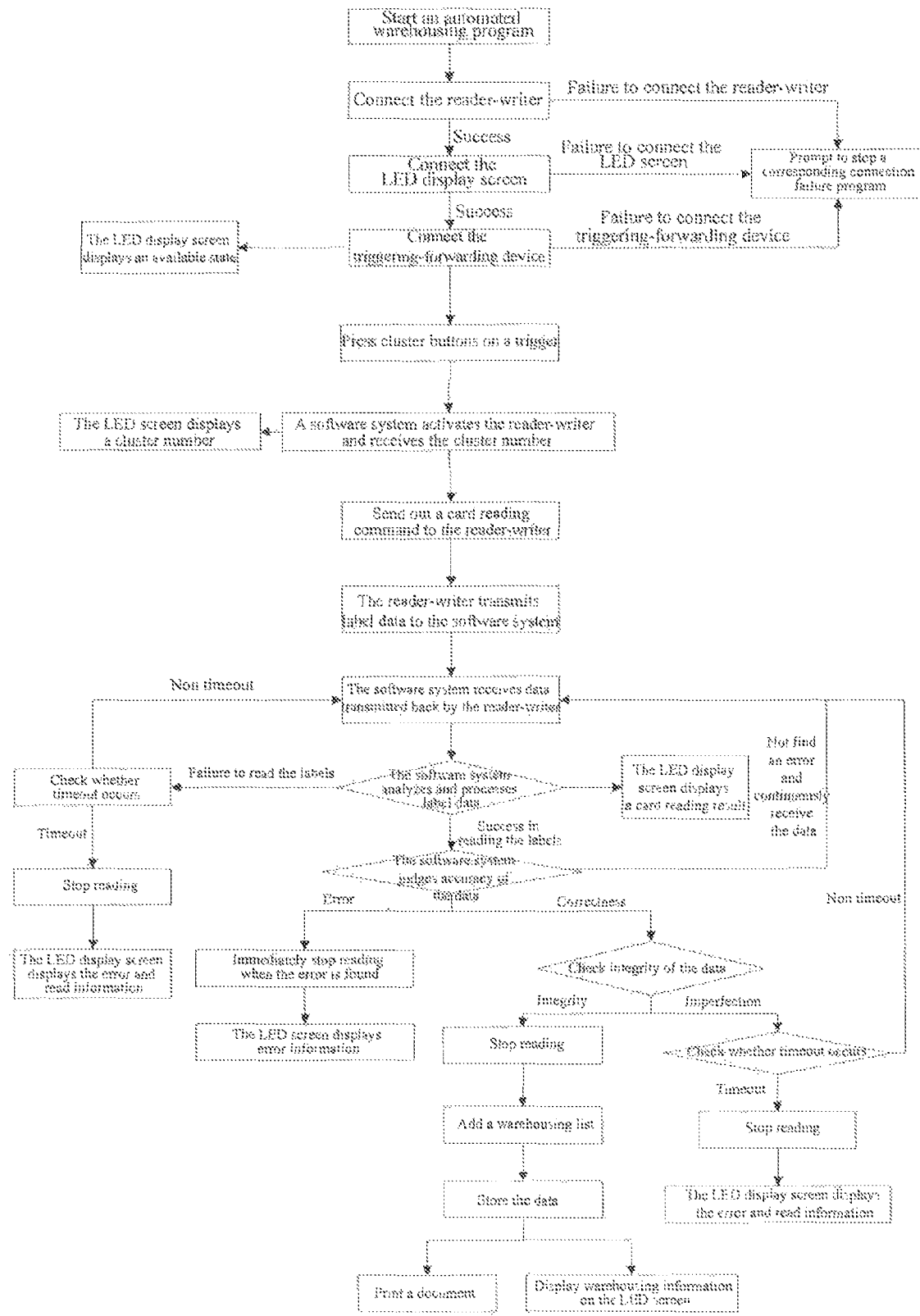
Figure 3:
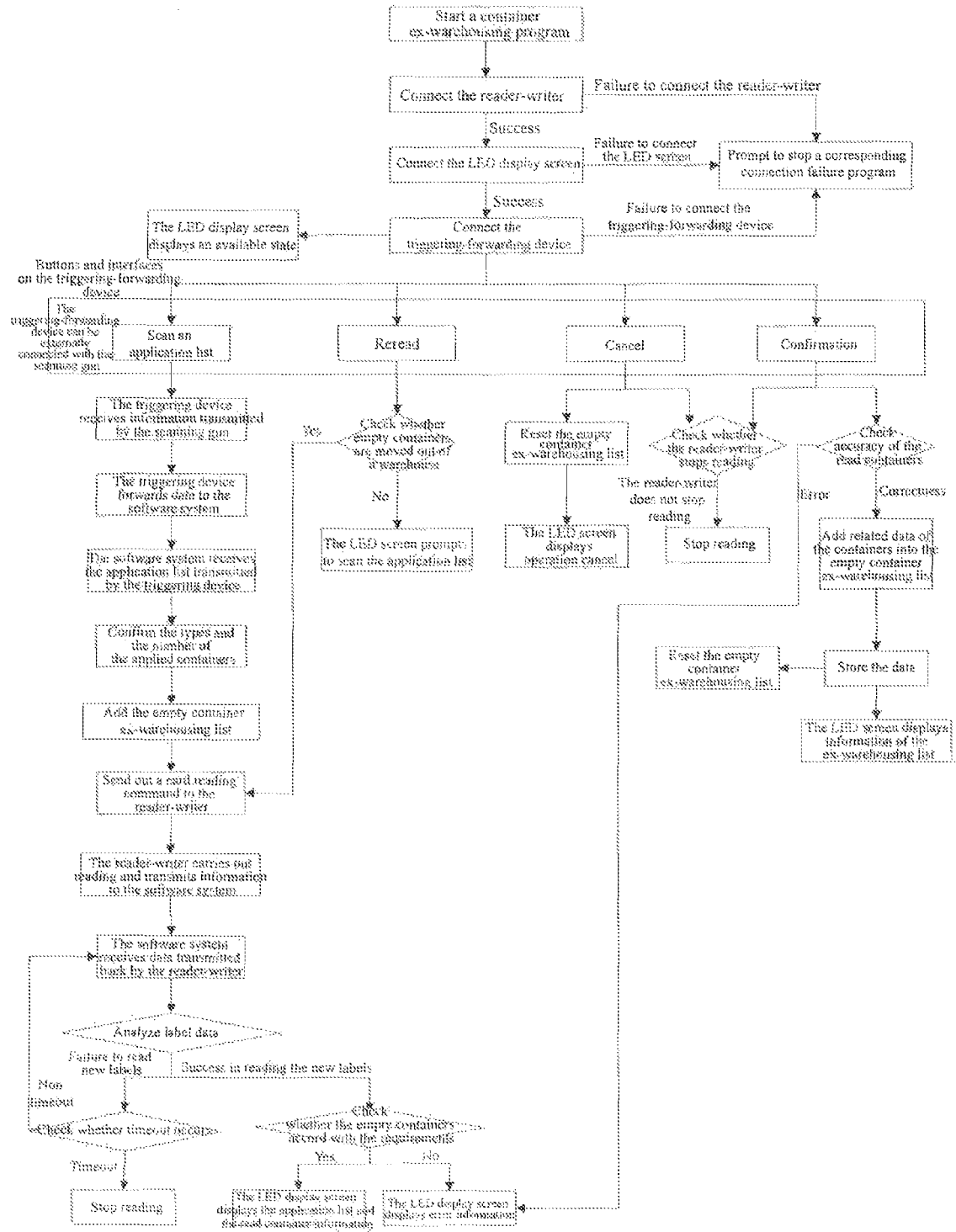
Figure 4:
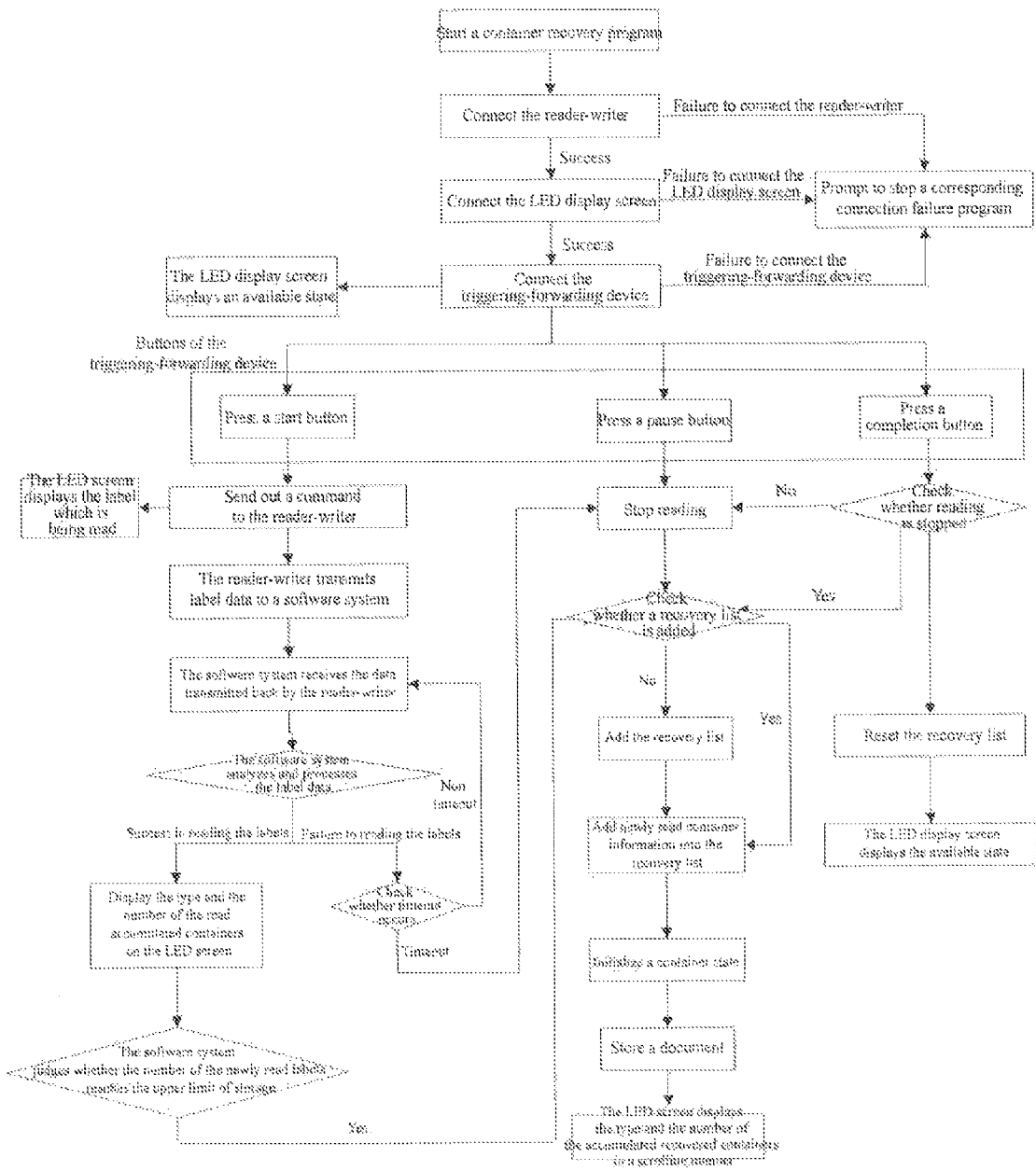

The invention is further illustrated by combining the accompanying drawings and embodiments, wherein
FIG. 1 is a diagram of a system of the invention;
FIG. 2 is a flowchart of the embodiment 1;
FIG. 3 is a flowchart of the embodiment 2; and
FIG. 4 is a flowchart of the embodiment 3.

DETAILED DESCRIPTION

With reference to FIG. 1, a system disclosed by the invention consists of the following hardware modules:
1) a triggering-forwarding device 5 which is used for starting and stopping the work of other related equipment or software in the automation process, outputting custom information, forwarding information of equipment without a network function to a network and directly feeding back received network information;
2) bar codes/labels 6, which are adhered to identified targets (cargoes or containers for accommodating the cargoes) and are used for recording related information of the containers;
3) a scanning gun 7, which is used for scanning information of the bar codes/labels 6 on the containers;
4) RFID chips 1, which are attached to the containers and are used for recording the related information of the containers;
5) an RFID reader-writer 2, which is used for reading information of the RFID chips 1 on the containers by utilizing a non-contact multi-read remote automated identification function;
6) a computer 3, which is connected with a database server by the network and is connected with the RFID reader-writer 2 and the scanning gun 7 by the triggering-forwarding device 5 or in a direct manner so as to analyze and process related data; and
7) a LED display screen 4, which is used for displaying related information in the automated production and logistics process.

The triggering-forwarding device 5 is provided with a controller module 51, a trigger module 52, a forwarding module 53 and a display module 54, wherein the trigger module 52 is provided with at least one button capable of defining an output signal; and the forwarding module 53 comprises at least one input interface 531 connected with information input equipment (such as the RFID reader-writer 2 and the scanning gun 7) and at least one output interface 532 connected with the computer 3 by the network. In specific embodiments, the output interfaces 532 can be RJ-45 network interfaces for forwarding received signals of the information input equipment to the computer 3 and the output signal defined by each button 521 can be utilized to trigger different operating states of other equipment directly or indirectly connected with the triggering-forwarding device 5 or a software system arranged on the other equipment. The output signal defined by each button 521 can be used as check data for the information read by the RFID reader-writer 2. The triggering-forwarding device 5 also can receive feedback information of the computer 3 and display the feedback information by the built-in display module 54 of the triggering-forwarding device 5.

By matching with corresponding RFID logistics management system software, the system flexibly applies various external automated identification equipment and relay control devices (the RFID reader-writer 2, the RFID chips 1, the scanning gun 7, the labels 6 and the triggering-forwarding device 5) and timely inputs information of production, warehousing, ex-warehousing and the like of an enterprise into a database. According to records of the information in the database, powerful data support is provided for cargo handling, ex-warehousing cargo preparation, counting, recovery of empty containers returned by clients, product responsibility tracking and the like of a warehouse, and production and logistics operation is guaranteed to be carried out in order by the rules.

At the present stage, the system disclosed by the invention is mainly applied to an automated warehousing scene, an automated ex-warehousing scene of empty container and an automated recovery scene of empty container.

The embodiment 1 shows application of the triggering-forwarding device in the automated warehousing scene:
the triggering-forwarding device 5 is applied to the automated warehousing scene, and character information of clusters is manually given to the buttons of the triggering-forwarding device according to the actual requirements of businesses; each button 521 respectively represents the number of clusters which need to be warehoused (one cluster means one set, i.e. the same cluster number is given to a plurality of containers which need to be warehoused according to a certain number, namely, the containers with the same cluster number belong to the same cluster); the human brain judges which button on the triggering-forwarding device 5 should be pressed according to the actual condition of warehousing, a judgment result of the human brain is forwarded to the software system, and simultaneously, other automatic equipment is enabled to enter the operating state; and the software system can accurately know which labels shall be read in the current scene according to command information sent out by the triggering-forwarding device 5 without complex logical judgment and feed back a result to the triggering-forwarding device 5 (or display the result on the LED display screen 4) after execution is completed.

Specific operation is as follows:
warehousing work does not require special personnel to operate the software system and as long as handling personnel completes one simple button pressing action, the triggering-forwarding device 5 can automatically complete work of starting the RFID reader-writer 2, the LED display screen 4 and the logistics software system and the system can automatically complete warehousing actions of products, such as warehousing billing, display and printing actions.

In the embodiment, one button 521 on the triggering-forwarding device 5 is pressed down mutually to forward the judgment result of personnel, such as the judgment result of one cluster, to the software system arranged on the computer 3 and the software system receives information, i.e. one cluster needs to be warehoused, which is sent out by the device; the RFID reader-writer 2 only reads data that one cluster is warehoused according to the information sent out by the triggering-forwarding device 5 and transmits corresponding data to the software system, the software system carries out analysis and judgment, a result is directly displayed on the LCD screen of the display module 54 of the triggering-forwarding device 5 (i.e. the triggering-forwarding device 5 receives information fed back by the software system), and certainly, voice prompt can be carried out in the feedback process in certain embodiments; and certainly, the information fed back by the software also can be directly displayed on the LED display screen 4 and suitable arrangement is carried out according to the requirements of each scene. Again for example, when a worker presses down the button 521 which represents the number of 2, the judgment result of two clusters of the worker is forwarded to the software system by the device and the software system receives information, i.e. two clusters need to be warehoused, which is sent out by the device; and the RFID reader-writer 2 only reads data that two clusters are warehoused according to the information sent out by the triggering-forwarding device 5 and transmits corresponding data to the software system, the software system carries out analysis and judgment, a result is directly displayed on the triggering-forwarding device 5 and voice prompt (OK) is carried out. By the analogy, if the RFID reader-writer 2 reads the cluster number of three or one when warehousing personnel presses down the button 521 which represents the number of 2, the triggering-forwarding device 5 can prompt an error of warehousing information (or the error is prompted by the LED display screen 4), the RFID reader-writer 2 stops reading, the warehousing personnel views the error information from an automated warehousing error list and corrects the error, and the clusters can be warehoused after the information is accurate.

The flow of the embodiment 1 is as shown in FIG. 2.

The embodiment 2 shows application of the triggering-forwarding device in the automated ex-warehousing scene of empty container:

the triggering-forwarding device 5 is applied to the automated ex-warehousing scene of empty container and, character information of reread, cancel, confirmation and the like is manually given to the buttons 521 of the triggering-forwarding device 5 according to the actual requirements of businesses; and the scanning gun 7 is connected by utilizing one USB interface of the triggering-forwarding device 5 to upload the scanned information of one bar code 6 to the software system, the information possibly is certain parameters and a document number which are required by the software system, or logical judgment basis, and the logical judgment basis is compared with actual data read by the RFID reader-writer 2 to obtain accurate logical judgment.

Specific operation is as follows:

warehousing personnel utilizes the scanning gun 7 externally connected to the triggering-forwarding device 5 to scan one bar codes 6 on an empty container application document, scanned related information of the application document is uploaded to the software system by the triggering-forwarding device 5, simultaneously, peripheral equipment is started to work and as long as the warehousing personnel pulls empty containers to pass through an RFID automated identification region, the system can automatically complete checking the type of the containers; and personnel takes the following actions according to check results: (1) when the type is checked as correct and is consistent with a number visually inspected by the personnel, the button 521 which represents confirmation is pressed down to carry out storage; (2) when the type is checked as wrong, the system can send error prompt to the triggering-forwarding device 5 and displays error information on the LED display screen 4, at the moment, manual judgment needs to be carried out to determine a document error, or label damage and the like, and after error processing is finished, a user can press down the button 521 which represents reread to obtain correct data; and (3) when the type is checked as correct, but the number read by the RFID reader-writer 2 is inconsistent with an actual required number, the user presses down the button 521 which represents cancel to cancel all data which is not filed. All the operation above is the process that the triggering-forwarding device 5 forwards the judgment results of personnel to the software system.

The flow of the embodiment 2 is as shown in FIG. 3.

The embodiment 3 shows application in the automated recovery scene of empty container in the field of logistics:

the triggering-forwarding device 5 is applied in the automated recovery scene of empty container and, character information of start, pause, completion and the like is manually given to the buttons 521 of the triggering-forwarding device 5 according to actual requirements of businesses; personnel judges whether to trigger the buttons on the device according to the actual condition of empty container recovery, a command of the personnel is forwarded to the software system, the software system directly starts or stops work of other automatic equipment (card reading of the RFID reader-writer 2 and display of the LED display screen on the related process) without complex logical judgment after receiving the command; and in the scene, the triggering-forwarding device 5 just simply forwards the command of the personnel to the related software system.

Specification operation is as follows:

recovery personnel presses down the button 521 which represents start on the triggering-forwarding device 5 to enable empty containers which are returned from clients and need to be recovered to pass through the RFID automated identification region and the system can automatically clear up original information of the containers to enable the containers to be returned to an initial available state; personnel gives a command to the device according to the actual condition of container recovery and presses down the button 521 which represents start, the triggering-forwarding device 5 receives the command sent out by the personnel and starts the RFID reader-writer 2 to carry out card reading, and the LED display screen 4 displays a current reading condition convenient for the software system to judge and store related information; the button 521 which represents pause is pressed down, the device temporarily stops the RFID reader-writer 2 from reading the labels according to the command sent out by the personnel and read label information is added into the system; and the button 521 which represents completion is pressed down and the triggering-forwarding device 5 finishes the empty container recovery work according to the command sent out by the personnel.

The flow of the embodiment 3 is as shown in FIG. 4.

In the logistics automation process, the invention carries out analysis and comparison on special operation automation and intelligent automation in details, refines each business stage and determines which judgment needs to be completed by human brains and which judgment needs to be automatically completed by the computer to avoid sending out wrong commands to the automatic equipment so as to ensure that the automatic equipment correctly completes related work.

To integrate logical judgment of personnel into the process of integral logistics automation, the invention adds the triggering-forwarding device in the automated logistics scenes. The triggering-forwarding device generally plays the following functions in each scene of production and logistics: triggering, forwarding and receiving/feedback, wherein triggering aims to enable other equipment in the integral scenes to enter the operating state at proper moment; forwarding means that part of judgment results of personnel or judgment of other equipment is forwarded to the software system by the equipment, so that the software system can easily send out the correct commands to other automatic equipment in the scenes; and receiving/feedback means that a result of data execution in the automation process is directly received and is shown in character and voice prompt forms without additionally adding other equipment to complete the work. Addition of the device brings great convenience to programming of automated logistics software and simplifies complex logical judgment.

The above is only the preferred embodiments of the invention and not intended to limit the scope of protection of the invention, and any solution for implementing the aim of the invention by basically same means shall belong to the scope of protection of the invention.

The invention claimed is:

1. An automated logistics system using a triggering-forwarding device, characterized in that: the system comprises:
   radio frequency identification device (RFID) chips (1), which are attached to identified targets and are used for recording related information of the identified targets;
   a RFID reader-writer (2), for reading information of the RFID chips (1) on the identified targets by utilizing a non-contact automated identification function;
   a computer (3), connected with a database server by a network to analyze and process related data; and
   the triggering-forwarding device (5), which is provided with a controller module (51), a trigger module (52), a forwarding module (53) and a display module (54), wherein the trigger module (52) is provided with at least one button (521) capable of defining an output signal; the forwarding module (53) comprises at least one input interface (531) connected with information input equipment and at least one output interface (532) connected with the computer (3) by the network, and is used for forwarding received signals of the information input equipment to the computer (3) by the network and utilizes the output signal defined by each button (521) to trigger different operating states of other equipment directly or indirectly connected with the triggering-forwarding device (5) or a software system arranged on the other equipment; an output signal of the trigger module (52) or the forwarding module (53) is used as check data for the information read by the RFID reader-writer (2); and the triggering-forwarding device (5) receives feedback information of the computer (3) and display the feedback information by the display module (54) of the triggering-forwarding device (5), further characterized in that: in application of automated warehousing scene, the output signal defined by each button (521) represents a number of clusters with the same container number and is used for checking the data read by the RFID reader-writer (2) when different operating states of other equipment directly or indirectly connected with the triggering-forwarding device (5) or the software system on the other equipment are triggered.

2. The automated logistics system using the triggering-forwarding device according to claim 1, characterized in that: the system further comprises:
   bar codes/labels (6), for recording the related information of the identified targets; and
   a scanning gun (7), for scanning information of the bar codes/labels (6).

3. The automated logistics system using the triggering-forwarding device according to claim 1, characterized in that: the system further comprises: a light emitting diode (LED) display screen (4) connected with the computer (3), which is used for displaying related information in the automated production and logistics process.

4. The automated logistics system using the triggering-forwarding device according to claim 1, characterized in that: the input interfaces (531) comprise serial ports, parallel ports and universal serial bus (USB) interfaces.

5. The automated logistics system using the triggering-forwarding device according to claim 1, characterized in that: the output interfaces (532) are registered jack-45 (RJ-45) network interfaces or wireless network interfaces.

6. The automated logistics system using the triggering-forwarding device according to claim 1, characterized in that: in applications of automated ex-warehousing scene of empty container and automated recovery scene of empty container, the output signals defined by the buttons (521) respectively represent different commands and the commands are used for triggering different operating states of other equipment directly or indirectly connected with the triggering-forwarding device (5) or the software system on the other equipment.

7. The automated logistics system using the triggering-forwarding device according to claim 6, characterized in that: in the application of automated ex-warehousing scene of empty container, the commands comprise reread, cancel and confirmation.

8. The automated logistics system using the triggering-forwarding device according to claim 6, characterized in that: in the application of automated recovery scene of empty container, the commands comprise start, pause and completion.

* * * * *

UNITED STATES PATENT AND TRADEMARK OFFICE
CERTIFICATE OF CORRECTION

| | | |
|---|---|---|
| PATENT NO. | : 9,105,004 B2 | Page 1 of 1 |
| APPLICATION NO. | : 14/123829 | |
| DATED | : August 11, 2015 | |
| INVENTOR(S) | : Chii Tsong Jang, Depin Gong and Deqiang Gong | |

It is certified that error appears in the above-identified patent and that said Letters Patent is hereby corrected as shown below:

On the title page, item 73

Under Assignee:

"Guangdong (KR)" should read --Guangdong (CN)--

Signed and Sealed this
Twelfth Day of January, 2016

Michelle K. Lee
*Director of the United States Patent and Trademark Office*